United States Patent

Brimmer

[11] Patent Number: 5,535,519
[45] Date of Patent: Jul. 16, 1996

[54] STRIPPER TOOL FOR NON-METALLIC SHEATHED CABLE

[76] Inventor: Roy F. Brimmer, P.O. Box 98, Quincy, Mich. 49082

[21] Appl. No.: 273,208

[22] Filed: Jul. 11, 1994

[51] Int. Cl.⁶ ...................................... H02G 1/12
[52] U.S. Cl. ............................. 30/90.1; 81/9.44
[58] Field of Search ................... 30/90.1, 91.2; 81/9.44; 29/129, 764

[56] References Cited

U.S. PATENT DOCUMENTS

| | | |
|---|---|---|
| 669,556 | 3/1901 | Spring . |
| 1,107,684 | 8/1914 | Mallory . |
| 1,456,928 | 5/1923 | Lake, Jr. . |
| 2,079,505 | 5/1937 | Hopkins . |
| 3,109,332 | 11/1963 | Rando . |
| 4,607,544 | 8/1986 | Jewell, Jr. . |
| 4,799,406 | 1/1989 | Diaz-De-Guerenu-Aquirrebeitia . |
| 4,870,876 | 10/1989 | Rodriquez . |
| 4,905,373 | 3/1990 | Krampe . |
| 4,912,847 | 4/1990 | Bradshaw . |
| 5,295,421 | 3/1994 | Mansfield ................... 30/90.1 |

FOREIGN PATENT DOCUMENTS

| 109397 | 3/1900 | Germany ................... 30/90.1 |
|---|---|---|

*Primary Examiner*—Douglas D. Watts
*Attorney, Agent, or Firm*—Ian C. McLeod; Mary M. Moyne

[57] ABSTRACT

A stripper 10 for removing the non-metallic outer sheath (52) from a cable (50) is described. The stripper includes a first member (12) and a second member (14) which are pivotably attached together to form a pair of pliers. The first and second members provide first and second handles (16) and (18) and first and second jaws (19) and (20). The first and second jaws contain first and second cutting edges (26) and (28) which come together to form a complete cutting opening (30). The cutting opening has two opposed arcuate ends (30A) with a narrower center portion (30B) in between. The tool cuts the outer sheath of the cable everywhere but the extreme opposed sides (52C) of the sheath. The user must pull on the outer sheath to break the extreme opposed sides and remove the sheath.

19 Claims, 3 Drawing Sheets

STRIPPER TOOL FOR NON-METALLIC SHEATHED CABLE

BACKGROUND OF THE INVENTION (1) Field of the Invention

The present invention relates to a method and tool for removing a non-metallic outer sheath from a cable. In particular, the present invention relates to a method and tool wherein the tool cuts the outer sheath of the cable without damaging the inner wires. The extreme opposed sides of the sheath of the cable are left uncut by the cutting blades of the tool. After cutting the sheath using the tool, the user pulls on the piece of sheath to be removed in order to break the extreme opposed sides of the sheath and thus remove the sheath.

(2) Prior Art

The prior art has described various types of wire strippers for electrical wires. Illustrative of wire strippers of the prior art are U.S. Pat. Nos. 669,556 to Spring; 4,607,544 to Jewell, Jr.; 4,799,406 to Diaz-De-Guerenu-Aquirrebeitia and 4,905,373 to Krampe.

Particularly, U.S. Pat. Nos. 3,109,332 to Rando and 4,912,847 to Bradshaw describe tools for cutting the outer sheath of a cable without damaging the internal covered wire or wires.

Rando describes a wire jacket skinner for removing the outer jacket from non-metallic sheathing cable. The pliers have a pair of rollers on one jaw opposite a cutting blade on the other jaw. In use, a cable is positioned between the rollers and the blade. The handles of the pliers are squeezed together so that the cable is grasped firmly between the blade edge and the rollers with the blade edge cutting into the outer jacket of the cable. The pliers are then pulled along the cable to strip the jacket of the cable to expose the insulated inner conductors.

Bradshaw describes a cutting tool for cutting the shell of wire-filled corrugated flexible plastic electrical conduit, commonly known as ENTX. The tool cuts into the conduit at a larger diameter section using a knife located on one of the jaws of the tool. The knife only cuts the shell and does not enter the portion of the conduit containing the wires.

In addition, U.S. Pat. No. 2,079,505 to Hopkins describes a tool with a concave jaw formed with a lateral rib. The shape of the cavities and the ribs of the jaw conform to the exterior configuration of the wire. The ribs fit within the grooves of the wire and prevent slipping on the wire and gouging or scoring of the wire. This tool is not a cutting or stripping tool and the grooved wire for which the tool was designed to handle does not have an external covering.

Finally, also of interest are U.S. Pat. Nos. 1,107,684 to Mallory; 1,456,928 to Lake and 4,870,876 to Rodriguez which describe tools for use with electrical wires.

None of the prior art patents describe a stripper tool having a cutting opening with opposed accurate ends to accommodate internal covered electrical wires on either side of the cable and a raised center portion to accommodate an internal uncovered ground wire between the pair of electrical wires within the cable.

OBJECTS

It is therefore an object of the present invention to provide a stripper tool to remove the outer sheath of an electrical cable having a pair of spaced apart covered electrical wires and an uncovered ground wire therebetween located inside the sheath. Further, it is an object of the present invention to provide a stripper tool which cuts the outer sheath of the cable without damaging the inner wires. Still further, it is an object of the present invention to provide a stripper tool which completely cuts the center of the sheath and leaves the extreme opposed sides of the sheath uncut. Further, it is an object of the present invention to provide a method for removing the outer sheath of a cable without damaging the wires inside. Still further, it is an object of the present invention to provide a stripping tool for cutting the outer sheath of a cable which is easy to use and inexpensive to manufacture.

DETAILED DESCRIPTION OF THE PREFERRED EMBODIMENTS

Figure 1:
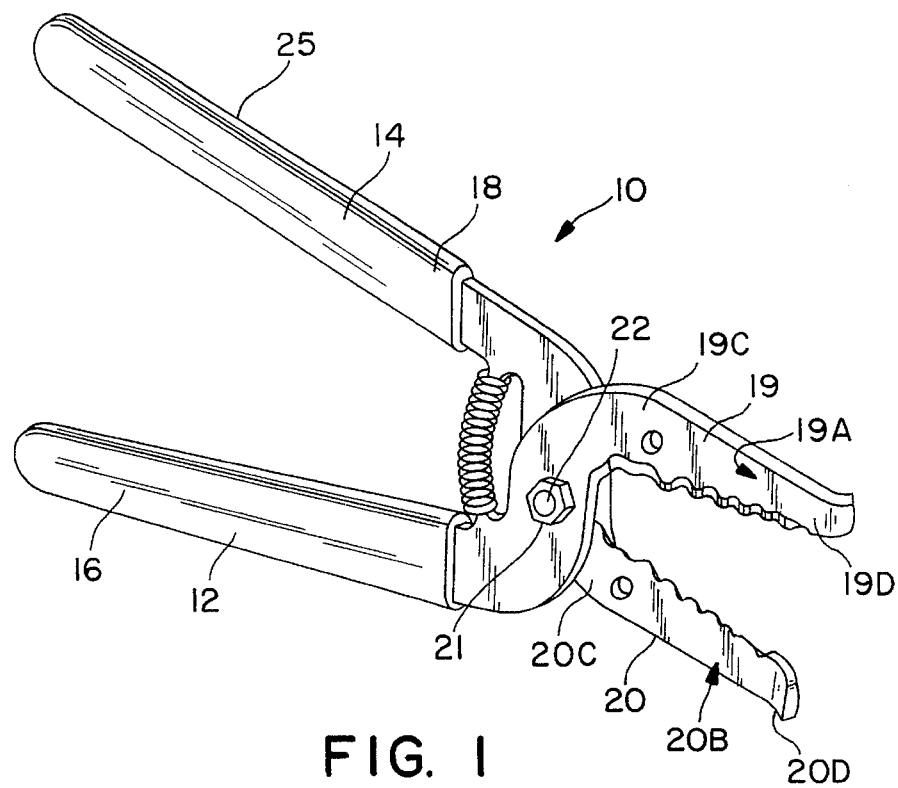
FIG. 1 is a perspective view of the stripper tool 10 of the present invention showing the first and second members 12 and 14.

The present invention relates to a tool adapted for cutting an outer sheath of a length of an electrical cable having inside the sheath parallel spaced apart insulation covered wires and a core member containing an uncovered ground wire between the insulation covered wires, wherein the sheath has spaced apart curved sides conforming to the covered wires which comprises: spaced apart first and second jaw members which are adapted to be pressed together with a portion of the cable along the length of the cable positioned between the jaw members, wherein the first and second jaw members are provided with cutting edges defining an opening configured to partially cut the sheath and the core without significantly cutting the insulation on the wires or the uncovered ground wire when the first and second members are pressed together to form the opening so that the spaced apart curved sides of the sheath are uncut by the cutting edges and wherein after the sheath has been cut, the portion of the sheath is pulled from the length at an end of the cable to break the curved sides of the sheath at the cut.

Furthermore, the present invention relates to a tool for cutting an outer sheath around an electrical cable containing a pair of insulation covered electrical wires with a core member containing an uncovered ground wire between the insulation covered wires, which comprises: a first jaw member extending parallel to a longitudinal axis of the tool with a first cutting means; a second jaw member spaced below and parallel to the first jaw member with a second cutting means, wherein a complete cutting means for cutting the outer sheathing is formed when the first jaw member and the second jaw member are pressed together, the complete cutting means having an opening such that the cable when positioned in the opening is perpendicular to the longitudinal axis of the tool, wherein a center portion of the opening is narrower than opposed ends of the opening such that the outer sheath of the cable adjacent to the core is cut and such that the outer sheath adjacent the spaced apart covered wires is cut except at spaced apart opposed sides of the outer sheath adjacent the covered wires, and wherein the outer sheath is pulled from cable upon being cut.

Still further, the present invention relates to a method for removing outer sheath of a length of an electrical cable having inside the sheath parallel spaced apart insulation covered wires and a core member containing an uncovered ground wire between the insulation covered wires wherein the sheath has spaced apart curved sides conforming to the covered wires which comprises: providing spaced apart first and second jaw members which are adapted to be pressed together with a portion or the cable along the length of the cable positioned between the jaw members, wherein the first and second jaw members are provided with cutting edges defining an opening configured to partially cut the sheath and the core without significantly cutting the insulation on the wires or the unsheathed ground wire when the first and second members are pressed together to form the opening so that the spaced apart curved sides of the sheath are uncut by the cutting edges; inserting the cable between the cutting edges such that the jaw members are adjacent the portion of the cable along the length of the cable spaced apart from the end of the cable from which the outer sheath is to be removed; pressing the first jaw member and the second jaw member together such that the cutting edges cut the outer sheath of the electrical cable so that the spaced apart curved sides of the sheath are uncut by the cutting edges; removing the jaw members from around the electrical cable; and pulling the outer sheath adjacent the end of the electrical cable to break the uncut curved sides of the sheath at the cut to remove the portion of the outer sheath from the cable to expose the covered wires and the uncovered wire within the cable. The complete cutting means cuts through the outer sheath of the cable on all sides, except at the extreme opposed sides without damaging the internal wires. Unexpectedly, the opposed sides of the outer sheath which are left uncut by the tool are easily ripped apart by tearing the outer sheath. The uncut areas of the outer sheath tear easily due to the ends of the cut which form weak spots which allow the ripping to begin in the outer sheath.

The first and second jaw members have handles and are connected together in the conventional manner to form pliers. A resilient means bias the handles of the tool apart after the squeezing pressure is released. Multiple additional second cutting edges are provided on the jaw members to allow for cutting the insulation around the individual wires for removal. Alternately, a supplementary cutting means is provided in the jaw members spaced apart from the complete cutting means. The supplementary cutting means allows for cutting the outer sheath of various sized cables.

Figure 2:
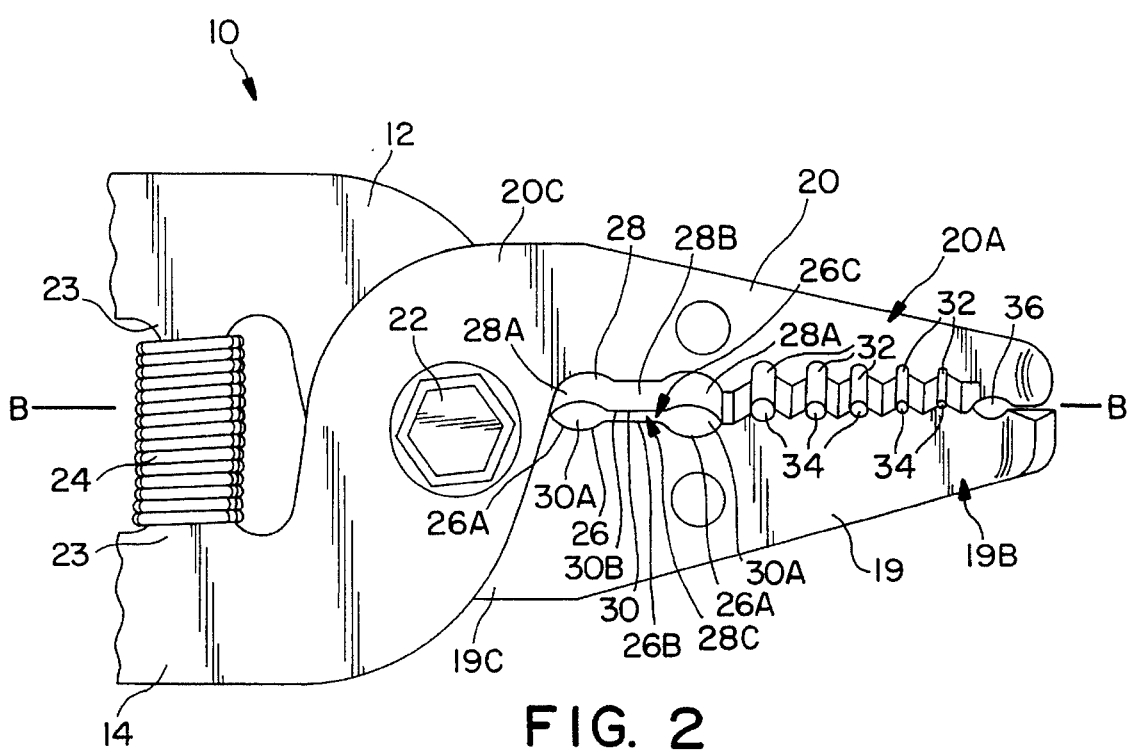
FIG. 2 is a side view of the first and second jaws 19 and 20 of the tool 10 showing the cutting edges 26 and 28 and the complete cutting opening 30.
Figure 3:
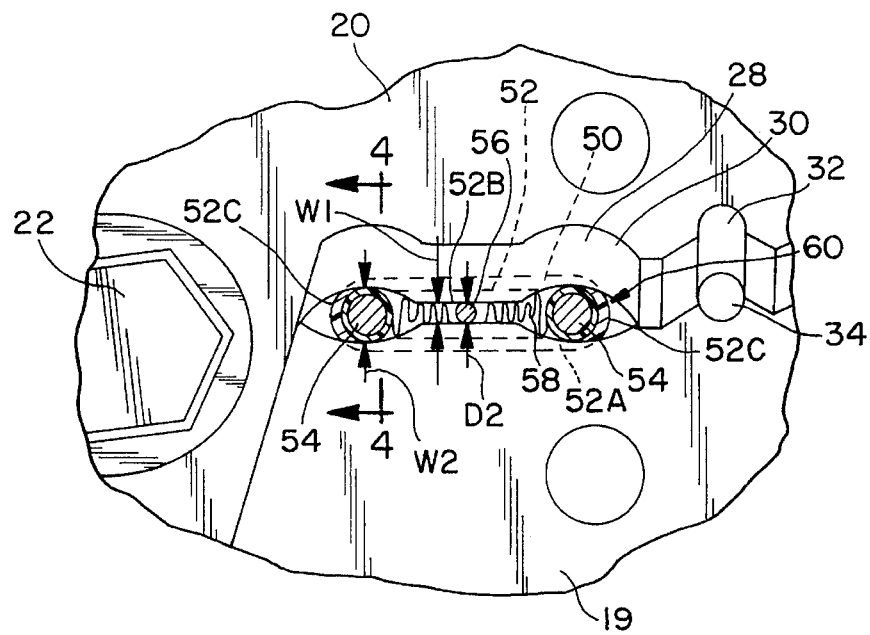
FIG. 3 is a partial view of the first and second jaws 19 and 20 specifically showing the cable 50 positioned within the complete cutting opening 30.

FIGS. 1 to 4 show the preferred embodiment of the stripper tool 10 of the present invention. The stripper tool 10 is adapted to remove the outer sheath 52 from a non-metallic sheathed cable 50. The cable 50 as shown in FIG. 3, has a non-metallic outer sheath 52 which encloses a pair of spaced apart electrical wires 54 and an uncovered ground wire 56 positioned between the electrical wires 54. Packing 58 is also located within the sheath 52 between the wires 54 and 56 and acts to keep the wires 54 and 56 spaced apart. The electrical wires 54 have an outer covering 60 which insulates the electrical wires 54 and prevents electrical shorts and prevents accidental electrical shock. The electrical wires 54 are spaced apart within the outer sheath 52 such as to form the opposed sides 52A of the non-metallic sheath 52. Preferably, the electrical wires 54 have a circular cross-section and are pressed against the opposed sides 52A of the non-metallic sheath 52 such as to give the opposed sides 52A of the sheath 52 an arcuate shape. In the preferred embodiment, the outer diameter D1 of the outer covering 60 of the electrical wires 54 is larger than the outer diameter D2 of the uncovered ground wire 56. Thus, the non-metallic sheath 52 of the cable 50 preferably has an essentially rectangular cross-section having a flat middle portion 52B and opposed arcuate sides 52A (FIG. 3). The positioning of the smaller outer diameter ground wire 56 between the larger diameter covered electrical wires 54 allows the flat middle portion 52B of the non-metallic sheath 56 of the cable 50 to be essentially flat and straight across. The larger diameter of the outer covering 60 of the electrical wires 54 elevate the outer sheath 52 such that in the normal position the outer sheath 52 is spaced above and below the ground wire 56. However, during cutting, the flat middle portion 52B of the outer sheath 52 of the cable 50 is pressed inward such as to contact the ground wire 56 (FIG. 3). The outer sheath 52 of the cable 50 is preferably constructed of a pliable plastic such as PVC which is easily cut by a sharp blade. The outer sheath 52 of the cable 50 is preferably 30 mills thick such that the knife blades 26C and 28C (to be discussed in detail hereinafter) of the tool 10 are able to easily cut through the outer sheath 52 and such that the user can pull the outer sheath 52 and easily tear the uncut extreme opposed sides 52C of the outer sheath 52. Preferably, the cable 50 is of the type commonly known as ROMEX™ sold by Electrical Supplies.

As shown in FIG. 1, the stripper tool 10 of the present invention is comprised of a first member 12 and a second member 14 which are attached together to form a pair of pliers. The first member 12 and second member 14 provide a first handle 16 and a second handle 18 of the tool 10 and a first jaw 19 and a second jaw 20 of the tool 10. Preferably, the first member 12 and the second member 14 are identical which enables the members to be interchangeable and reduces manufacturing costs.

The members 12 and 14 are joined together at a pivot point 15 by a pivot nut 21 and a pivot bolt 22. The pivotal connection enables the members 12 and 14 to pivot about pivot axis A—A of the tool 10 with respect to each other. The handles 16 and 18 and the jaws 19 and 20 of the first and second members 12 and 14 extend outward from the pivot point 15 perpendicular to the pivot axis A—A of the tool 10 and parallel to the longitudinal axis B—B of the tool 10 (FIG. 2). The members 12 and 14 are connected in the conventional plier arrangement such that the second handle 18 of the tool 10 is spaced above and parallel to the first handle 16 of the tool 10 when the first jaw 19 of the tool 10 is spaced above and parallel to the second jaw 20 of the tool 10 (FIG. 1). It is understood however, that flipping the tool 10 over, reverses the respective positions of the handles 16 and 18 and the jaws 19 and 20. Thus, when the handles 16 and 18 of the tool 10 are moved together, the jaws 19 and 20 of the tool 10 move together in a corresponding fashion. The handles 16 and 18 have nubs 23 adjacent to the pivot point 15 which extend upward perpendicular to the axis B—B of the tool 10. A single coil spring 24 is mounted between the nubs 23 and acts to bias the handles 16 and 18 and thus the jaws 19 and 20 of the tool 10 apart once the closing pressure on the handles 16 and 18 has been released. In addition, upon complete closing of the handles 16 and 18, the nubs 23 contact each other and prevent the handles 16 and 18 from being pressed beyond the closed position thus, preventing bending of the first and second members 12 and 14 of the tool 10. As shown in FIG. 1, the handles 16 and 18 of the tool 10 are preferably encased in an insulated outer coating 25 in order to enable the user (not shown) to better grip the tool 10 and also to protect the user against electrical shock in case the jaws 19 and 20 of the tool 10 accidentally cut into a "hot" electrical wire (not shown).

The jaws 19 and 20 have proximal ends 19C and 20C and distal ends 19D and 20D with an outside surface 19A and 20A and an inside surface 19B and 20B, therebetween. The members 12 and 14 of the tool 10 are connected together such that the inside surface 19B of the first jaw 19 is adjacent the inside surface 19B of the second jaw 20. As shown in FIG. 2, in the closed position, the jaws 19 and 20 of the tool 10 are preferably angled inward toward the axis B—B of the tool 10 such that the proximal ends 19C and 20C of the jaws 19 and 20 adjacent the pivot point 15 are larger than the opposed distal ends 19D and 20D of the jaws 19 and 20. The angled shape of the jaws 19 and 20 enables the tool 10 to be used in tighter spaces.

A first and second cutting edge 26 and 28 are located in the proximal ends 19C and 20C of the jaws 19 and 20 adjacent the pivot point 15. The cutting edges 26 and 28 have two opposed arcuate ends 26A and 28A with a raised middle portion 26B and 28B therebetween. The cutting edges 26 and 28 have an elongated shape extending along the jaws 19 and 20 parallel to the axis B—B of the tool 10. The cutting edges 26 and 28 are positioned along the first and second jaw 19 and 20 such that when the jaws 19 and 20 are moved together into the closed position, a complete cutting opening 30 is formed by the first and second cutting edges 26 and 28 of the first and second jaws 19 and 20 of the tool 10 (FIG. 2). The cutting edges 26 and 28 of the jaws 19 and 20 are tapered inward from the outside surface 19A and 20A of the jaws 19 and 20 toward the inside surface 19B and 14D of the jaws 19 and 20. A knife blade 26C and 28C is formed on the cutting edges 26 and 28 at the inside surfaces 19B and 20B of the jaws 19 and 20. The cutting edges 26 and 28 are tapered inward such that the knife blade 26C of the first jaw 19 is directly adjacent and parallel to the knife blade 28C of the second jaw 20. The sharpness of the knife blades 26C and 28C is such as to easily cut the outer sheath 52 of the cable 50. When the jaws 19 and 20 are closed, the two arcuate ends 26A and 28A of the cutting edges 26 and 28 form opposed arcuate ends 30A of the complete cutting opening 30 and the raised middle portion 26B and 28B of the first and second cutting edges 26 and 28 form a narrower center portion 30B of the complete cutting opening 30. The complete cutting opening 30 is shaped such that the center portion 30B has a width less than that of the opposed arcuate ends 30A of the complete cutting opening 30. Preferably, the width W2 of the center portion 30B of the complete cutting opening 30 is only slightly larger than the outer diameter D2 of the uncovered ground wire 56. Similarly, the width W1 of the opposed arcuate ends 30A of the complete cutting opening 30 is preferably slightly larger than the outer diameter D1 of the outer covering 60 of the electrical wires 54.

Figure 4:
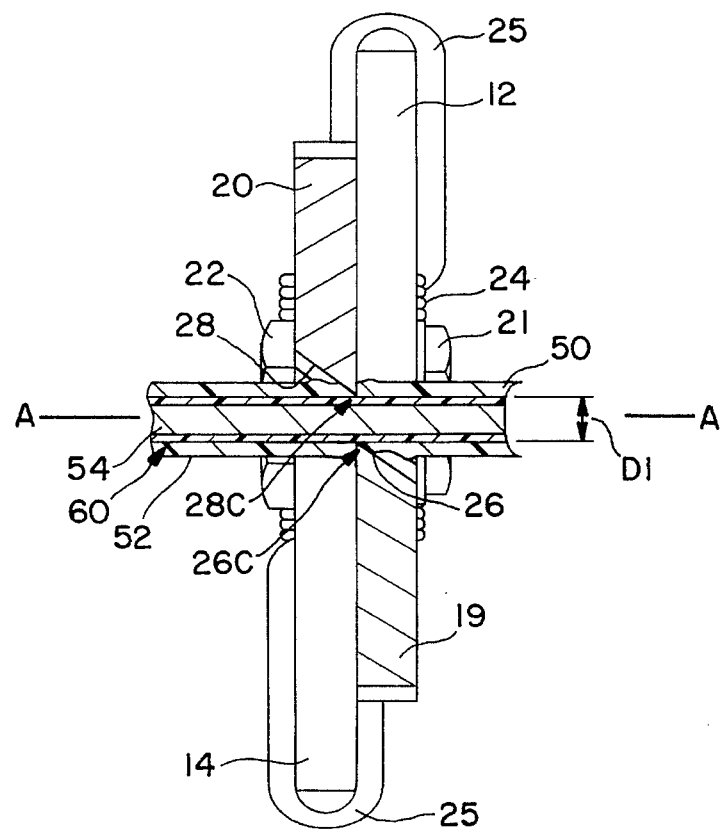
FIG. 4 is a cross-sectional view of FIG. 3 along the line 4—4 showing the knife blades 26C and 28C of the cutting edges 26 and 28 extending through the outer sheath 52 of the cable 50.

As shown in FIG. 3, the length of the cutting opening 30 is greater than the width of the cable 50 between the opposed sides 52A of the outer sheath 52. Thus, when the jaws 19 and 20 of the tool 10 are completely closed, the opening 30 extends beyond the opposed sides 52A of the sheath 52 and does not cut the extreme opposed sides 52C of the sheath 52. The shape and width of the opposed ends 30A and center portion 30B of the complete opening 30 are such that when the jaws 19 and 20 of the tool 10 are completely closed, the knife blades 26C and 28C of the cutting edges 26 and 28 sever the outer sheath 52 of the cable 50 everywhere except the extreme opposed sides 52C of the sheath 52 (FIG. 3). In addition, the widths W1 and W2 of the cutting opening 30 are such that when the tool 10 is in the completely closed position, the knife blades 26C and 28C do not contact any of the three inner wires 54 and 56 or their coverings 60. Thus, the cutting blades 26C and 28C do not extend into the outer covering 60 of the electrical wires 54 or into the uncovered ground wire 56 (FIG. 4). Cutting into the outer covering 60 of the electrical wires 54 may cause an electrical short in the wires 54 which could lead to an electrical fire or cause electrical failure. Although, there is less cause for alarm if the ground wire 56 is nicked, completely severing the ground wire 56 could cause problems. Preferably, the size of the cutting opening 30 is such as to accommodate the common sized ROMEX™ cable mainly 4/2, 12/2 or 10/2. The jaws 19 and 20 of the tool 10 are preferably constructed from metal with the cutting edges 26 and 28 and the knife blades 26C and 28C formed directly into the jaws 19 and 20 by a machining process.

In the preferred embodiment, the jaws 19 and 20 are provided with a plurality of semi-circular recesses 32 in the distal ends 19D and 20D of the jaws 19 and 20 spaced apart from the complete cutting opening 30. The semi-circular recesses 32 are positioned such that a plurality of circular openings 34 are formed when the first and second jaws 19 and 20 are moved together (FIG. 2). Preferably, the plurality of circular openings 34 are similar to conventional wire strippers which are used for stripping individually covered wires. The plurality of semi-circular recesses 32 allow for stripping a variety of sized wires.

The distal ends 19D and 20D of the jaws 19 and 20 beyond the semi-circular recesses 32 are curved toward the inside surface 19B and 20B of the jaws 19 and 20, respectively. The curving of the distal ends 19D and 20D of the jaws 19 and 20 forms a gap 36 between the jaws 19 and 20 at the distal ends 19D and 20D (FIG. 2). The gap 36 along with the curved distal ends 19D and 20D of the jaws 19 and 20 enables the tool 10 to be used to twist wires (not shown). The edges of the gap 36 are dull in order to reduce the risk of damaging the wire during twisting.

Figure 5:
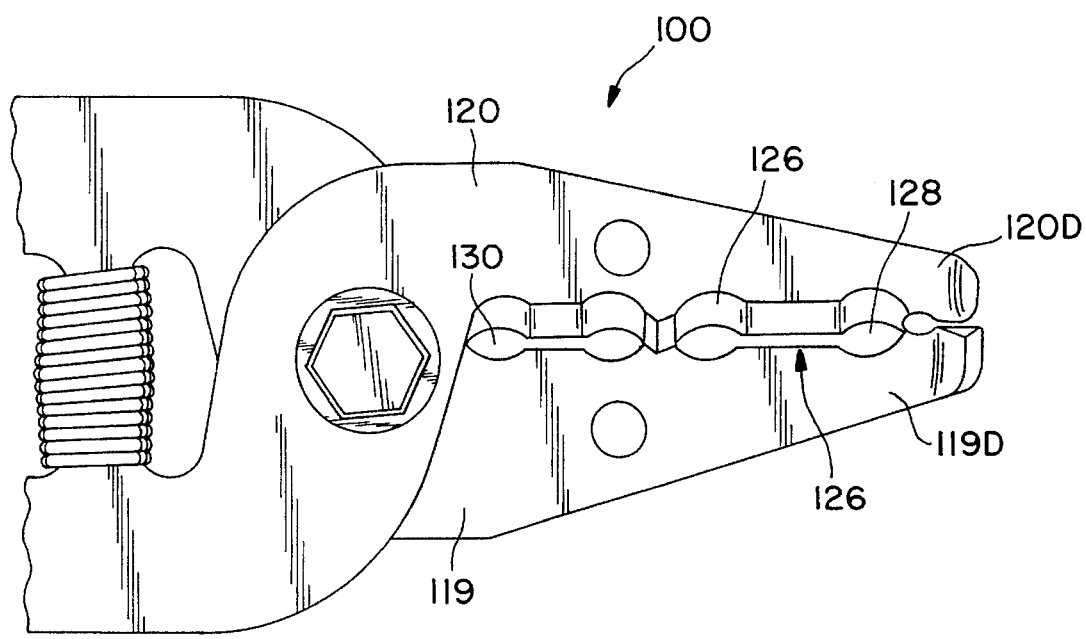
FIG. 5 is a side view of the tool 100 of the alternate embodiment showing first and second jaws 119 and 120 and the supplementary cutting opening 128.

FIG. 5 shows an alternate embodiment of the tool 10 of the present invention. The tool 100 of the alternate embodiment is similar to the tool 10 of the preferred embodiment except that the semi-circular recesses 32 in the distal ends 19D and 20D of the jaws 19 and 20 have been replaced by supplementary cutting edges 126 (one shown). Similarly to the preferred cutting edges 26 and 28 of the tool 10, the supplementary cutting edges 126 form a supplementary cutting opening 128 when the jaws 119 and 120 of the tool 100 are pressed together. The supplementary cutting opening 128 is spaced apart from the first complete cutting opening 130 toward the distal ends 119D and 120D of the jaws 119 and 120. Preferably, the supplementary cutting opening 128 is identical to the first complete cutting opening 130 in shape and width but has a different length. The supplementary cutting opening 128 allows the tool 100 to be used to strip two different sizes of cable 50. Common sizes of cable 50 for which the tool 100 can be adapted are 14/2 and 12/2 or 12/2 and 10/2 or any combination thereof.

IN USE

To use the tool 10, the jaws 19 and 20 of the stripper tool 10 are placed on either side of the cable 50 spaced apart from the end (not shown) of the cable 50 from which the outer sheath 52 is to be stripped. The jaws 19 and 20 are positioned around the cable 50 such that the cutting edges 26 and 28 are located on either side of the cable 50 with the raised middle portion 26B and 28B of the cutting edges 26 and 28 adjacent the flat middle portion 52B of the outer sheath 52 of the cable 50 (FIG. 3). The cable 50 is positioned between the jaws 19 and 20 of the tool 10 such that the cable 50 is perpendicular to the axis B—B of the tool 10 and the portion of the outer sheath 52 to be stripped is extending outward from one side of the jaws 19 and 20 of the tool 10. The handles 16 and 18 of the tool 10 are then pressed together such that the cutting edges 26 and 28 form the complete cutting opening 30 around the cable 50. The complete cutting opening 30 is formed around the cable such that the opposed ends 30A of the opening 30 are adjacent the opposed sides 52A of the outer sheath 52 of the cable 50 and the narrower center portion 30B of the opening 30 is adjacent the flat middle portion 52B of the outer sheath 52 of the cable 50. The extreme opposed sides 52C of the sheath 52 are spaced apart from the opposed ends 30A of the opening 30. The handles 16 and 18 are further pressed together such that the knife blades 26C and 28C of the cutting edges 26 and 28 cut into the outer sheath 52 of the cable 50. Preferably, the force needed to cut the sheath 52 with the stripper tool 10 is easily accomplished by an adult using one hand (not shown). In the completely closed position, the knife blades 26C and 28C only cut through the outer sheath 52 of the cable 50 and do not cut into the outer covering 60 of the electrical wires 54 or into the uncovered ground wire 56. Once the outer sheath 52 is cut, the pressure on the handles 16 and 18 of the tool 10 is released and the tool 10 is removed from around the cable 50. As seen in FIG. 3, the extreme opposed sides 52C of the outer sheath 52 are left uncut by the tool 10. After the tool 10 is removed, the user grasps the portion of the outer sheath 52 to be removed and pulls. Slight pulling on the sheath 52 easily breaks the uncut extreme opposed sides 52C of the outer sheath 52. Once the outer sheath 52 is removed, the user can use the plurality of circular recesses 32 to remove the outer covering 60 from the electrical wires 54 which were exposed after removal of the outer sheath 52 of the cable 50.

Numerous variations will occur to those skilled in the art. It is intended therefore, that the foregoing descriptions be only illustrative of the present invention and that the present invention be limited only by the hereinafter appended claims.

I claim:

1. A tool adapted for cutting an outer sheath of a length of an electrical cable having inside the sheath parallel spaced apart insulation covered wires and an uncovered ground wire between the insulation covered wires, wherein the sheath has an essentially rectangular cross-section with spaced apart curved sides conforming to the covered wires which comprises:

spaced apart first and second jaw members which are adapted to be pressed together with a portion of the cable along the length of the cable positioned between the jaw members, wherein the first and second jaw members are provided with cutting edges defining a complete opening with an elongate center portion formed by the cutting edges which is narrower than opposed ends of the opening; the complete opening being configured to partially cut the sheath without significantly cutting the insulation on the wires or the uncovered ground wire when the first and second members are pressed together to form the opening with the cable positioned in the opening such that the center portion of the opening is adjacent the ground wire so that the spaced apart curved sides of the sheath are uncut by the cutting edges and wherein after the sheath has been cut, the portion of the sheath is pulled from the length at an end of the cable to break the curved sides of the sheath at the cut.

2. The tool of claim 1 wherein the first and second jaw members are pliers with the first and second jaw members secured together by a pivot means with handles on distal ends of the tool.

3. The tool of claim 2 wherein a resilient means is mounted between the handles to bias the handles apart.

4. The tool of claim 3 wherein an insulated cover is provided on the handles.

5. The tool of claim 2 wherein the jaw members and the handles are in parallel planes.

6. The tool of claim 1 wherein the cutting edge on the first member has a tapered knife edge adjacent to the cutting edge on the second member.

7. The tool of claim 1 wherein multiple additional second cutting edges are provided on the jaw members defining second openings with second cutting edges for cutting the insulation around the wires for removal.

8. A tool for cutting an outer sheath around an electrical cable containing a pair of insulation covered electrical wires with a core member containing an uncovered ground wire between the insulation covered wires, which comprises:

(a) a first jaw member extending parallel to a longitudinal axis of the tool with a first cutting means;

(b) a second jaw member spaced below and parallel to the first jaw member with a second cutting means, wherein a complete cutting means for cutting the outer sheath is formed when the first jaw member and the second jaw member are pressed together, the complete cutting means having an opening with an elongate center portion formed by the cutting means which is narrower than opposed ends of the opening such that when the cable is positioned in the opening, the cable is perpendicular to the longitudinal axis of the tool, such that the outer sheath of the cable adjacent to the core member is cut and such that the outer sheath adjacent the spaced apart covered wires is cut except at spaced apart opposed sides of the outer sheath adjacent the covered wires, and wherein the outer sheath is pulled from cable upon being cut.

9. The tool of claim 8 wherein the first jaw member and the second jaw member are pivotally mounted together by a pivot means.

10. The tool of claim 8 wherein the first and second cutting means are formed as part of the first and the second jaw members respectively.

11. The tool of claim 8 wherein the first and second cutting means have a raised middle portion defining the center portion of the opening spaced between opposed ends.

12. The tool of claim 8 wherein the opening of the complete cutting means is greater in length than the width of the cable such that the spaced apart opposed sides of the cable are uncut by the cutting means when the first jaw member and the second jaw member are pressed together.

13. The tool of claim 11 wherein the opposed ends of the opening of the complete cutting means have an arcuate shape such as to approximate a shape of the sheath of the of the cable except at the spaced apart opposed sides of the cable.

14. The tool of claim 8 wherein supplementary cutting means are provided on the jaw means spaced apart from the cutting means to form a supplementary opening for cutting the outer sheath of different sized cable.

15. The tool of claim 8 wherein the first jaw member and the second jaw member are provided with a first and a second handle means respectively.

16. The tool of claim 15 wherein the first handle means extends outward parallel to the longitudinal axis of the tool from a pivot means between the first and second handle means and wherein the second handle extends below and parallel to the first handle means.

17. The tool of claim 15 wherein a resilient means is mounted between the first handle means and the second handle means to bias the handles apart.

18. The tool of claim 13 wherein the diameter of the opposed ends of the opening of the complete cutting means is only slightly greater than the diameter of the covered wires of the electric cable.

19. The tool of claim 8 wherein the width of the center portion of the opening of the complete cutting means is only slightly greater than the diameter of the ground wire such as to completely cut the outer sheath of the cable without cutting the ground wire.

* * * * *